(12) United States Patent
Gong et al.

(10) Patent No.: US 12,621,542 B2
(45) Date of Patent: May 5, 2026

(54) METHOD, APPARATUS, ELECTRONIC DEVICE AND STORAGE MEDIUM FOR ITEM PRESENTING

(71) Applicant: Beijing Zitiao Network Technology Co., Ltd., Beijing (CN)

(72) Inventors: Jiaxing Gong, Beijing (CN); Shaofeng Bu, Beijing (CN); Yan Huang, Beijing (CN); Mingyuan Wang, Beijing (CN); Jianlong Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 43 days.

(21) Appl. No.: 18/569,579

(22) PCT Filed: Aug. 23, 2022

(86) PCT No.: PCT/CN2022/114083
§ 371 (c)(1),
(2) Date: Dec. 12, 2023

(87) PCT Pub. No.: WO2023/030079
PCT Pub. Date: Mar. 9, 2023

(65) Prior Publication Data
US 2024/0292068 A1     Aug. 29, 2024

(30) Foreign Application Priority Data

Sep. 6, 2021   (CN) .......................... 202111039785.X

(51) Int. Cl.
*H04N 21/81*          (2011.01)
*G06T 19/00*          (2011.01)
(Continued)

(52) U.S. Cl.
CPC ......... *H04N 21/8146* (2013.01); *G06T 19/00* (2013.01); *H04N 21/2187* (2013.01); *H04N 21/4316* (2013.01); *H04N 21/47815* (2013.01)

(58) Field of Classification Search
CPC ........... H04N 21/8146; H04N 21/2187; H04N 21/4316; H04N 21/47815; H04N 21/4312;
(Continued)

(56) References Cited

U.S. PATENT DOCUMENTS 6,901,379 B1 *  5/2005  Balter ................ G06Q 30/0643
                                                            715/755
2009/0138377 A1 *  5/2009  Oh ...................... G06Q 30/0601
                                                            705/26.1
(Continued)

FOREIGN PATENT DOCUMENTS

CN          109889855 A       6/2019
CN          111031334 A       4/2020
(Continued)

OTHER PUBLICATIONS

International Patent Application No. PCT/CN2022/114083; Search Report; dated Nov. 8, 2022; 3 pages.
(Continued)

*Primary Examiner* — Chenea Davis
(74) *Attorney, Agent, or Firm* — BakerHostetler

(57)          ABSTRACT

A method, apparatus, electronic device and storage medium for item presenting are disclosed herein. The method of item presenting comprises: displaying a live stream interface for displaying a live stream image of a live streamer, receiving
(Continued)

a trial operation for a target item recommended by a live streamer; and displaying a virtual image after the user using the target item in response to the trial operation.

18 Claims, 8 Drawing Sheets

(51) Int. Cl.
    *H04N 21/2187*     (2011.01)
    *H04N 21/431*     (2011.01)
    *H04N 21/478*     (2011.01)

(58) Field of Classification Search
    CPC .. H04N 21/431; H04N 21/472; H04N 21/478;
                                  G06T 19/00; G06Q 30/06
    See application file for complete search history.

(56)              References Cited

U.S. PATENT DOCUMENTS

| | | | | |
|---|---|---|---|---|
| 2014/0282137 | A1* | 9/2014 | Lin | G06Q 30/0643 |
| | | | | 715/765 |
| 2015/0324103 | A1* | 11/2015 | Tepmongkol | G06F 3/04847 |
| | | | | 715/757 |
| 2016/0042565 | A1* | 2/2016 | Osada | G06T 11/00 |
| | | | | 345/632 |
| 2019/0050427 | A1* | 2/2019 | Wiesel | G06T 19/00 |
| 2019/0179405 | A1* | 6/2019 | Sun | G06F 1/1686 |
| 2020/0098123 | A1 | 3/2020 | Anadure et al. | |

FOREIGN PATENT DOCUMENTS

| | | |
|---|---|---|
| CN | 111405343 A | 7/2020 |
| CN | 111586428 A | 8/2020 |
| CN | 112218111 A | 1/2021 |
| CN | 112367532 A | 2/2021 |
| CN | 112533052 A | 3/2021 |
| CN | 113014934 A | 6/2021 |
| CN | 113298585 A | 8/2021 |
| CN | 113301412 A | 8/2021 |
| CN | 114266621 A | 4/2022 |

OTHER PUBLICATIONS

Chinese Patent Application No. 202111039785.X; First Office Action, dated Dec. 15, 2023, 16 pages with machine translation.
Chinese Patent Application No. 202111039785.X; Notification of Grant dated Jun. 27, 2024, 7 pages with machine translation.
Cavallo et al., "Cave-AR: A VR Authoring System to Interactively Design, Simulate, and Debug Multi-user AR Experiences," arXiv:1809.05500v2, Feb. 28, 2019, 9 pages.
Wei et al., "Research on the Innovation of Scenario Shopping Based on 5G Application: Taking the Development and Application of 'Visionary Cat' as an Example," China Academic Journal Electronic Publishing house, 2020, pp. 53-55 with English abstract.

* cited by examiner

DISPLAY A LIVE STREAM INTERFACE, WHEREIN THE LIVE STREAM INTERFACE IS FOR PRESENTING A LIVE STREAM IMAGE OF A LIVE STREAMER — S101

RECEIVE A TRIAL OPERATION FOR A TARGET ITEM RECOMMENDED BY THE LIVE STREAMER — S102

IN RESPONSE TO THE TRIAL OPERATION, PRESENT A VIRTUAL IMAGE AFTER A USER USING THE TARGET ITEM — S103

LIVE STREAM IMAGE

21

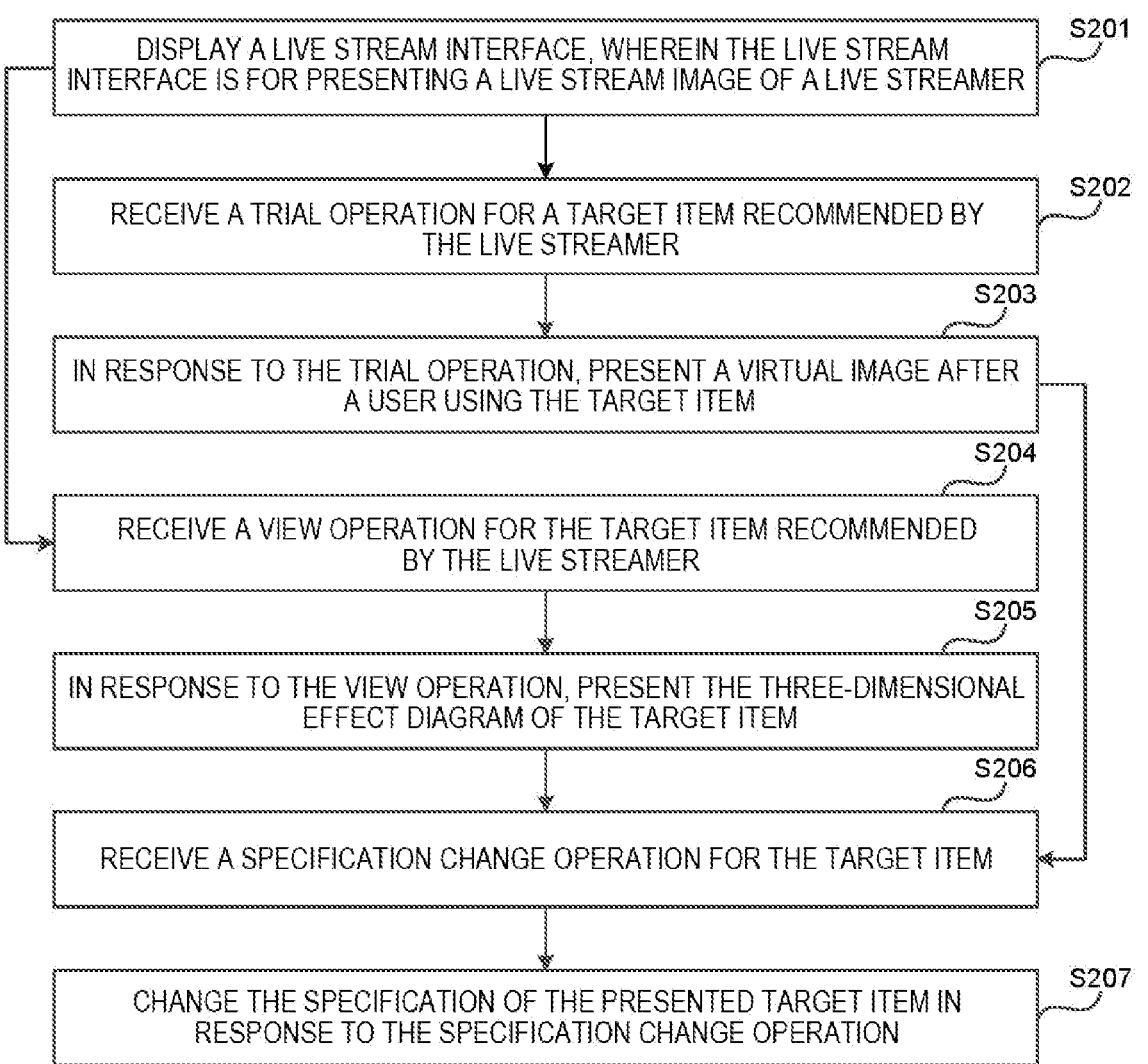

DISPLAY A LIVE STREAM INTERFACE, WHEREIN THE LIVE STREAM INTERFACE IS FOR PRESENTING A LIVE STREAM IMAGE OF A LIVE STREAMER — S201

RECEIVE A TRIAL OPERATION FOR A TARGET ITEM RECOMMENDED BY THE LIVE STREAMER — S202

IN RESPONSE TO THE TRIAL OPERATION, PRESENT A VIRTUAL IMAGE AFTER A USER USING THE TARGET ITEM — S203

RECEIVE A VIEW OPERATION FOR THE TARGET ITEM RECOMMENDED BY THE LIVE STREAMER — S204

IN RESPONSE TO THE VIEW OPERATION, PRESENT THE THREE-DIMENSIONAL EFFECT DIAGRAM OF THE TARGET ITEM — S205

RECEIVE A SPECIFICATION CHANGE OPERATION FOR THE TARGET ITEM — S206

CHANGE THE SPECIFICATION OF THE PRESENTED TARGET ITEM IN RESPONSE TO THE SPECIFICATION CHANGE OPERATION — S207

FIG. 11

METHOD, APPARATUS, ELECTRONIC DEVICE AND STORAGE MEDIUM FOR ITEM PRESENTING

CROSS-REFERENCE OF RELATED APPLICATIONS

This application is the U.S. National Stage of International Application No. PCT/CN2022/114083, filed on Aug. 23, 2022, which claims priority to Chinese Patent Application No. 202111039785.X, filed with the Chinese Patent Office on Sep. 6, 2021, which are incorporated herein by reference in their entireties.

FIELD

The present disclosure relates to the field of computers, for example, to a method, apparatus, electronic devices of item presenting and a storage media.

BACKGROUND

During live streaming, users can view a wearing effect when a live streamer wears a recommended item, or after the item is on the shelf, view detailed information of the item to determine whether to accept the live streamer's recommendation.

However, in the way of item presenting through live streaming, users cannot intuitively view items recommended by the live streamer, resulting in a poor user experience.

SUMMARY

The present disclosure provides a method, apparatus, electronic device and storage medium for presenting an item to visually present the item recommended by the live streamer to the user.

The disclosure provides a method of item presenting, comprising:

displaying a live stream interface, wherein the live stream interface is for presenting live stream image of a live streamer;

receiving a trial operation for a target item recommended by the live streamer; and in response to the trial operation, presenting a virtual image after a user using the target item.

The disclosure also provides an apparatus of item presenting, comprising:

a live stream interface displaying module configured to display a live stream interface, wherein the live stream interface is for presenting a live stream image of a live streamer;

a trial operation receiving module configured to receive a trial operation for a target item recommended by the live streamer; and a virtual image presenting module configured to present a virtual image after a user using the target item in response to the trial operation.

The present disclosure also provides an electronic device comprising:

one or more processors;

a memory configured to store one or more programs;

when the one or more programs are executed by the one or more processors, the one or more processors are caused to implement the above method of item presenting.

The present disclosure also provides a computer-readable storage medium having stored thereon a computer program which, when executed by a processor, implements the above method of item presenting.

BRIEF DESCRIPTION OF THE DRAWINGS

FIG. 11 shows a flowchart of another method of item presenting according to embodiments of the present disclosure;

DETAILED DESCRIPTION

Figures 1, 2:
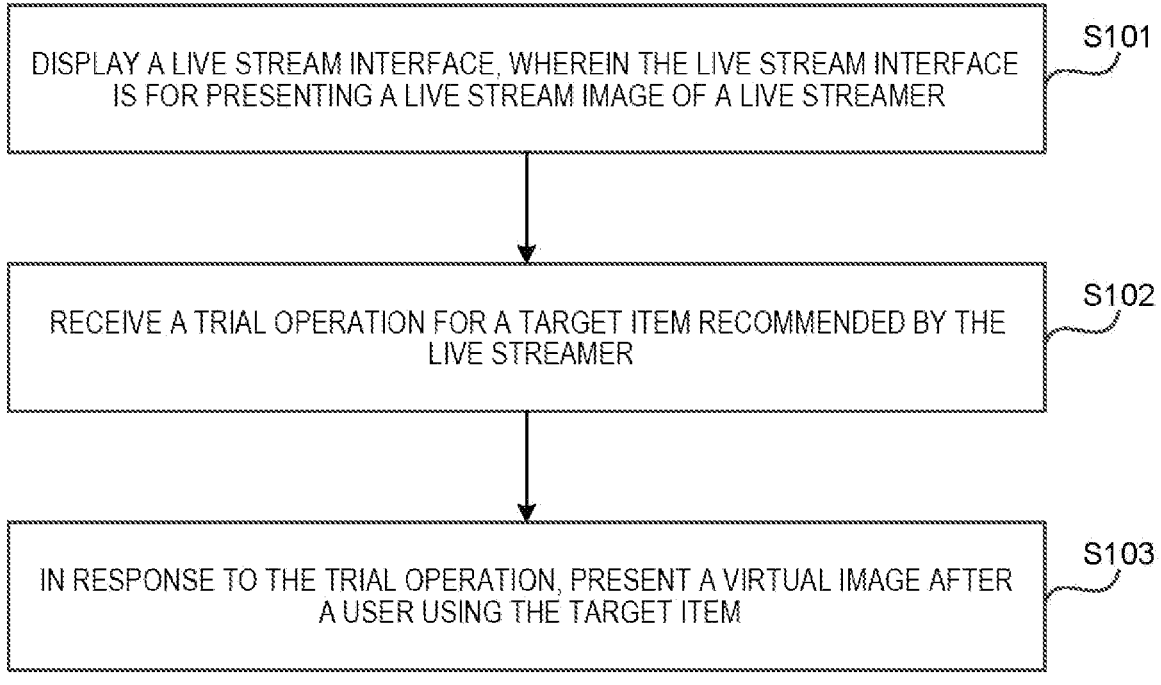
FIG. 1 shows a schematic flowchart of a method of item presenting according to embodiments of the present disclosure.
FIG. 2 shows a schematic diagram of a live stream interface according to embodiments of the present disclosure.

The following embodiments of the present disclosure will be described with reference to the accompanying drawings. Although some embodiments of the present disclosure are shown in the drawings, the disclosure may be implemented in various forms, and these embodiments are provided to understand the present disclosure. The drawings and embodiments of the present disclosure are for illustrative purposes only.

The multiple steps described in the method implementation of the disclosure can be executed in different orders and/or in parallel. In addition, the method implementation can comprise additional steps and/or omit the steps as shown. The scope of the disclosure is not limited in this regard.

The term "comprising" and its variations used herein are open-ended, i.e. "comprising but not limited to". The term "based on" means "at least partially based on". The term "one embodiment" means "at least one embodiment"; the term "another embodiment" means "at least one further embodiment"; and the term "some embodiments" means "at least some embodiments". Relevant definitions of other terms will be given in the following description.

The concepts of "first" and "second" mentioned in the disclosure are only used to distinguish different devices, modules, or units, and are not used to limit the order or interdependence of the functions performed by these devices, modules, or units.

The modifications of "one" and "multiple" mentioned in the disclosure are illustrative and not restrictive. Those skilled in the art should understand that unless otherwise indicated in the context, they should be understood as "one or more".

Names of the messages or information exchanged between multiple devices in implementations of the present disclosure are for illustrative purposes only and are not intended to limit the scope of these messages or information.

FIG. 1 shows a schematic flowchart of a method of item presenting according to embodiments of the present disclosure. The method can be performed by an apparatus of item presenting, wherein the apparatus can be implemented by software and/or hardware and can be configured in an electronic device. For example, the apparatus can be configured in a mobile phone, a tablet, or a computer. The method of item presenting provided in embodiments of the present disclosure is adapted for a scene where items recommended in a live stream room are viewed. As shown in FIG. 1, the method of item presenting provided in embodiments of the present disclosure may comprise the followings.

S101, displaying a live stream interface, the live stream interface being for presenting a live stream image of a live streamer.

The live stream interface may be an interface (such as a web interface or a display interface in a user terminal) for users (i.e., viewers) to watch a live stream, which can be used to present a live stream image of the live stream currently watched by the user. The live stream may be a live stream for recommending items, such as a live stream conducted by an e-commerce company or a live stream for selling goods conducted by a live streamer. Correspondingly, the live streamer can recommend and/or present items to users through the live stream.

A live streamer can enable a live stream and recommend items to users through the live stream. Therefore, when users want to view a live stream, they can instruct the electronic device to display a live stream interface of the live stream, such as performing an operation of entering a live stream room of the live streamer. Correspondingly, when the electronic device detects the user's operation of entering a live stream room, it can display the live stream interface and present a live stream image in the live stream interface, that is, present the live stream image of the live streamer, as shown in FIG. 2.

S102, receiving a trial operation for a target item recommended by the live streamer.

The trial operation may be an operation of trying an item recommended by the live streamer, such as an operation of triggering a presenting control (such as a try-on control) of an item recommended by the live streamer. Correspondingly, the target item may be an item corresponding to the trial operation, which can be an item recommended by the live streamer in the live stream, such as the item that the live streamer is recommending at the current moment (i.e., the current recommended item), the latest item recommended by the live streamer before the current moment (comprising the current moment), or any item recommended by the live streamer in this live stream (such as any item that the live streamer has already listed in the live stream room), etc. The item may be a real item or a virtual item.

The electronic device plays the live stream image of the live streamer in the live stream interface. Therefore, when users want to view a usage effect of an item recommended by the live streamer, they can trigger a try-on control for the item. For example, they can trigger the try-on control for the item in the currently displayed live stream interface or a presenting interface. Correspondingly, when the electronic device detects that a user triggers the try-on control for an item, it can determine the item as the target item and determine receiving a trial operation for the target item.

S103, in response to the trial operation, presenting a virtual image after the user using the target item.

In this implementation, when a user watches the live stream, the virtual image after the user using the target item recommended by the live streamer can be presented to the user based on the user's trial operation, so that the user can intuitively view the target item and the effect after the user using the target item, thereby reducing the situation where the user returns and exchanges goods due to poor effects after purchase, reducing the time and money costs incurred by the merchant and the user due to returns and exchanges, and improving the user's experience of viewing the live stream and purchasing experience.

The virtual image can be virtual image of the user using the target item. For example, when the target item is a wearable item, the virtual image may be a virtual image for presenting a wearing effect of the user wearing the target item. When the target item is cosmetics, the virtual image may be a virtual image for presenting the makeup effect of the user using the target item, and so on.

When the electronic device receives the user's trial operation, it can respond to the trial operation, obtain the virtual image after the user using the target item, and present the virtual image in the live stream interface or presenting interface. The presenting interface may be an interface such as a web page interface or a display interface in the user terminal.

Figure 3:
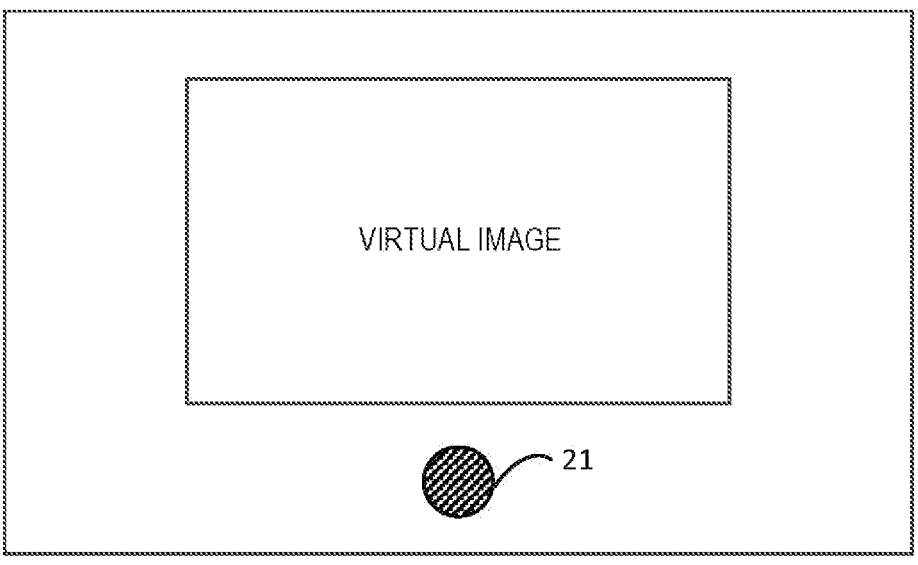
FIG. 3 shows a schematic diagram of a way of presenting a virtual image in a live stream interface according to embodiments of the present disclosure.
Figure 4:
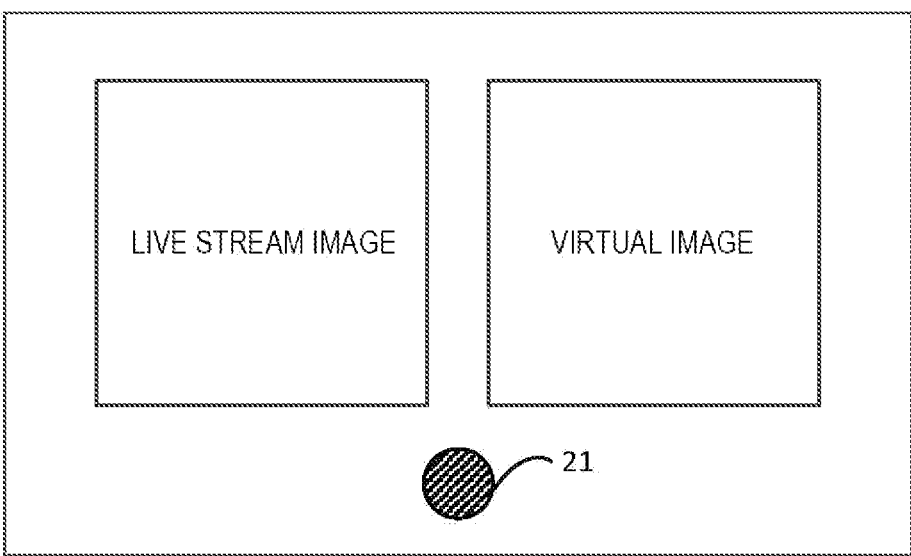
FIG. 4 shows a schematic diagram of another way of presenting a virtual image in a live stream interface according to embodiments of the present disclosure.
Figure 5:
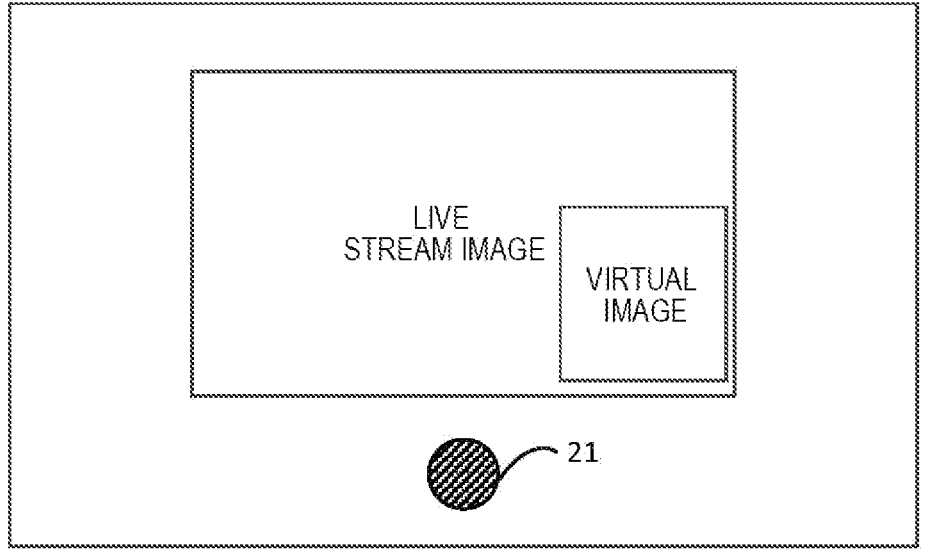
FIG. 5 shows a schematic diagram of yet another way of presenting a virtual image in a live stream interface according to embodiments of the present disclosure.
Figure 6:
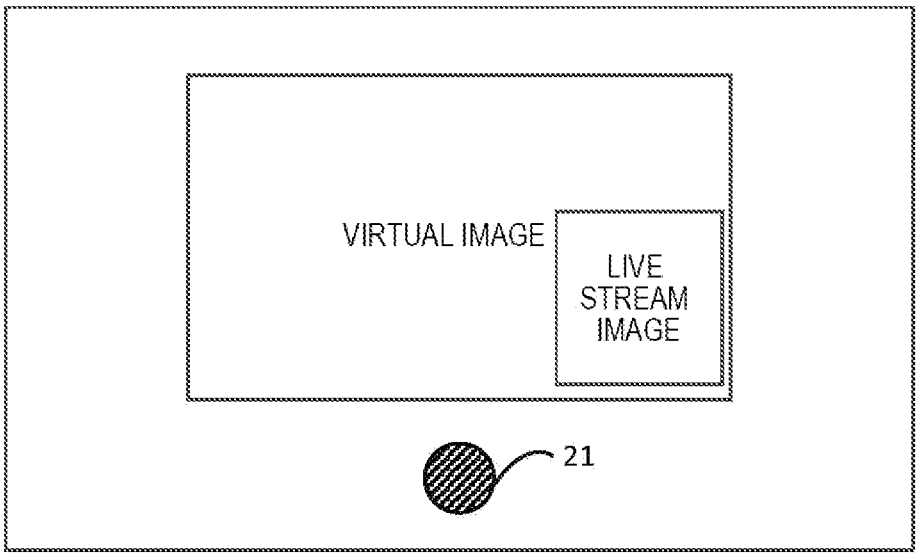
FIG. 6 shows a schematic diagram of still another way of presenting a virtual image in a live stream interface according to embodiments of the present disclosure.

In one embodiment, the electronic device can present virtual image in the live stream interface after the user using the target item. For example, the electronic device can present the trial control of the target item in the live stream interface, and switch the live stream image presented in the live stream interface to virtual image after the user using the target item when it detects that the user triggers the trial control of the target item, as shown in FIG. 3. Alternatively, the electronic device can create a virtual image presenting region in the live stream interface, and present the virtual image after the user using the target item in the virtual image presenting region. The present size of the live stream image can be adjusted according to the size of the virtual image presenting region, as shown in FIGS. 4-6.

Figure 7:
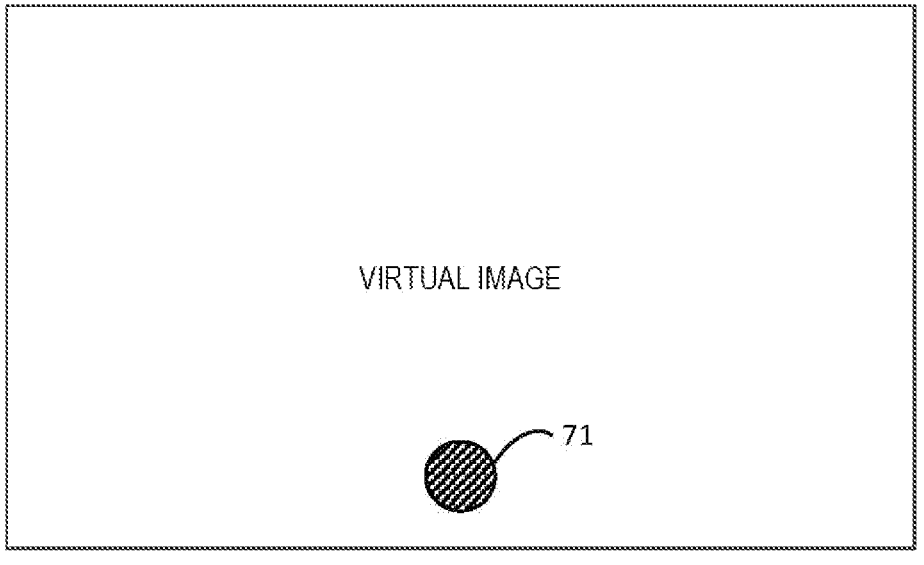
FIG. 7 shows a schematic diagram of a way of presenting a virtual image in a presenting interface according to embodiments of the present disclosure.

In another embodiment, the electronic device may also present a virtual image after the user using the target item in the presenting interface. For example, the electronic device can present the trial control of the target item in the live stream interface, and switch, when the user triggers the trial control of the target item, the current display interface from the live stream interface to the presenting interface and present the virtual image after the user using the target item in the presenting interface, as shown in FIG. 7.

In addition, the presenting interface may also display trial controls with the target item and/or other items, so that a user can switch the target item used by the user in the virtual image by triggering the trial control of the corresponding item.

In this embodiment, when the trial control of the target item is presented in the live stream interface/presenting interface, the trial control may be directly presented in the live stream interface/presenting interface, or it can be presented in a recommended item list of the live stream interface/presenting interface, and this embodiment does not limit it. Considering the convenience for a user to try the corresponding item and the simplicity of the interface, the trial control of the item that the live streamer is recommending in the live stream image can be presented in the live stream interface/presenting interface, and the trial controls of multiple recommended items recommended by the live streamer in this live stream can be presented in the recommended item list of the live stream interface/presenting interface. Thus, a user can view the trial effect of the item currently being recommended by the live streamer by triggering the trial control presented in the live stream interface/presenting interface. The user may also instruct the electronic device to display the recommended item list in the live stream interface/presenting interface through the corresponding triggering operation, and view the trial effect of the item by triggering the trial control of the item presented in the recommended item list.

Figure 8:
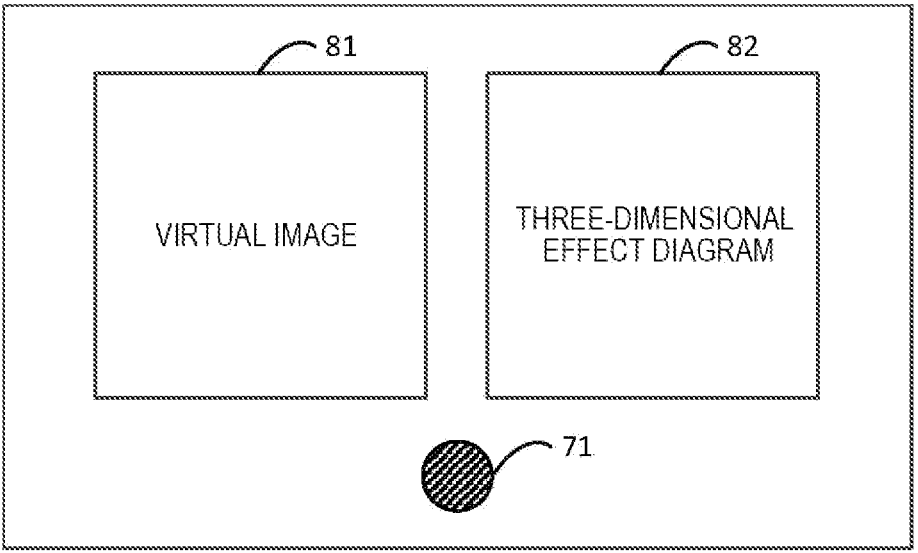
FIG. 8 shows a schematic diagram of another way of presenting a virtual image in a presenting interface according to embodiments of the present disclosure.
Figure 9:
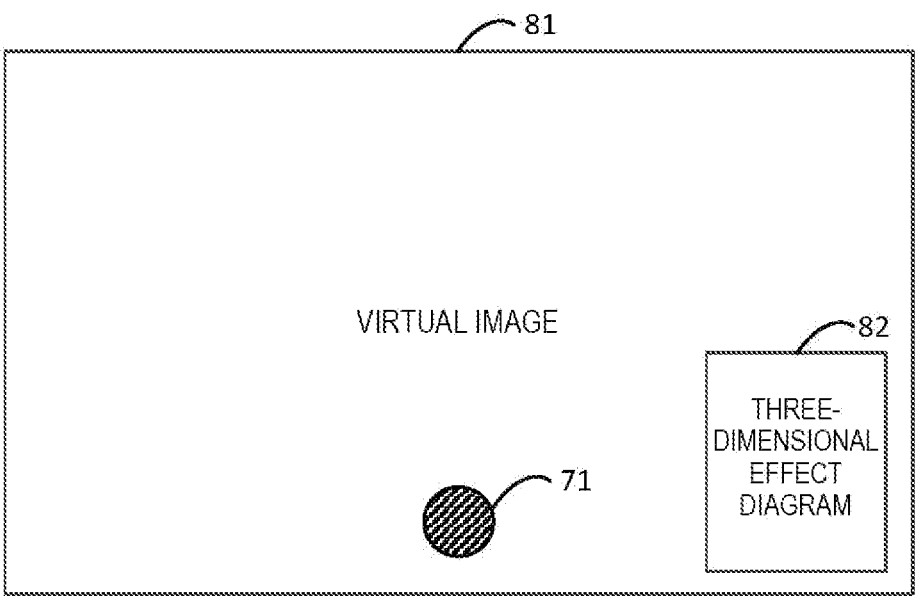
FIG. 9 shows a schematic diagram of yet another way of presenting a virtual image in a presenting interface according to embodiments of the present disclosure.
Figure 10:
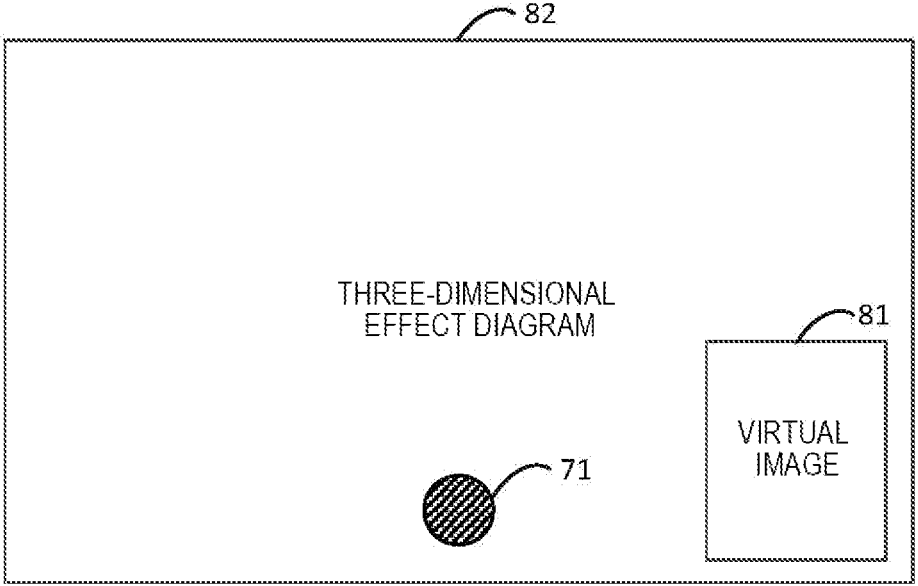
FIG. 10 shows a schematic diagram of still another way of presenting a virtual image in a presenting interface according to embodiments of the present disclosure.

In embodiments of the present disclosure, when receiving a trial operation for the target item, the electronic device may present only the virtual image after the user using the target item, or may present the three-dimensional effect diagram of the target item, as shown in FIG. 8-10, so that the user can view the details of the target item. The presenting virtual image after a user using the target item comprises: presenting the virtual image after the user using the target item in the first presenting region 81, and presenting the three-dimensional effect diagram of the target item in the second presenting region 82. Herein the first presenting region 81 may be an region of a live stream interface/presenting interface for presenting virtual image after the user using the target item, and the second presenting region 82 may be an region of a live stream interface/presenting interface for presenting the three-dimensional effect diagram of the target item. The first presenting region 81 may not overlap with the second presenting region 82 (FIG. 8), or may be located in a lower layer (FIG. 9) or an upper layer (FIG. 10) of the second presenting region 82.

In one embodiment, the method further comprises, before presenting the virtual image after a user using the target item: obtaining item information of the target item, and turning on a camera to capture a user's video image through the camera; and generating virtual image after the user using the target item according to the item information and the video image.

The item information can be the displayed information of the target item such as the size and/or color information of the target item, or the present effect of the target item. The item information may be actively sent by a server to the electronic device. Alternatively, the electronic device can request obtaining the item information from the server when receiving a user's trial operation.

When the electronic device receives the trial operation, it can turn on the camera to capture the user's video image. Further, the electronic device sends an item information obtaining request of the target item to the server, and receives the item information of the target item returned by the server based on the item information obtaining request. Alternatively, in addition to pushing the video stream of the live streamer for live stream to the electronic device during the live stream process, the server may also recommend an item on the live streamer end and send the item information of the item to the electronic device. Correspondingly, when the electronic device receives the trial operation for the target item, it can obtain the item information of the target item locally. Therefore, when obtaining the item information of the target item, the electronic device can generate virtual image after the user using the target item in its corresponding usage location based on the usage location information of the item information and the specification information of the item.

In embodiments of the present disclosure, in order to improve the present effect of the target item in the virtual image, the virtual image after the user using the target item can be generated according to the three-dimensional effect diagram of the target item and the shooting angle for the user in the video. In this way, when the shooting angle changes, such as when a user rotates to allow his/her different sides to be shot, the trial effect for his/her corresponding side after using the target item can be viewed in real time. For example, when the target item is a wearable item (such as clothing, etc.), the user can view the front wearing effect after wearing the target item by facing the camera, and can view the side or back wearing effect after wearing the target item by facing the camera sideways or with his/her back to the camera.

The item information is a three-dimensional effect diagram, and generating the virtual image after the user using the target item based on the item data and the video image may comprise: determining a shooting angle for the user in the video image; determining item image of the target item when the presenting angle is the shooting angle according to the three-dimensional effect diagram; and composing the item image with the video image to obtain the virtual image after the user using the target item.

The shooting angle may be a shooting angle of the camera when shooting the user, such as the presenting angle for a user in the video image (such as front, side, or back).

For example, for the video frame captured by the camera at the current time, the shooting angle of the user in the video frame can be first identified, such as identifying the imaging angle of the user in the video frame, and obtaining presenting image for a three-dimensional effect diagram of the target item when the presenting angle is the imaging angle. The three-dimensional effect diagram is as the item image of the target item. For example, when a user faces the camera, the front presenting image for the three-dimensional effect diagram of the target item can be obtained. When a user faces the camera sideways, the side presenting image for the three-dimensional effect diagram of the target item can be obtained, and so on. Then, according to the usage location information of the target item, the video frames are composed with the presenting image to obtain the virtual image after the user using the target item in its corresponding part at the current shooting angle.

The method of item presenting provided in embodiments of the present disclosure comprises: displaying a live stream interface for presenting live stream image of a live streamer; receiving a trial operation for a target item recommended by the live streamer; and presenting virtual image after a user using the target item in response to the trial operation. By adopting the above technical solution, the virtual image after the user using the item recommended in the live stream are presented to the user when the user watches the live stream, so that the user can intuitively view the usage effect of the item recommended in the live stream and improve the user's viewing experience.

FIG. 11 shows a schematic flow diagram of another method of item presenting provided in embodiments of the present disclosure. The scheme in embodiments of the present disclosure can be combined with one or more optional schemes in the above embodiments. The method of item presenting provided in embodiments of the present disclosure further comprises: receiving a view operation of the target item recommended by the live streamer; presenting a three-dimensional effect diagram of the target item in the presenting interface in response to the view operation. After presenting virtual image after the user using the target item in the presenting interface of the target item, the method further comprises: receiving a specification change operation for the target item; and changing a specification of the presented target item in response to the specification change operation.

Accordingly, as shown in FIG. 11, the method of item presenting provided in embodiments of the present disclosure may comprise the followings.

S201, displaying a live stream interface, performing S202 or S204, the live stream interface being for presenting a live stream image of a live streamer.

S202, receiving a trial operation for a target item recommended by the live streamer.

S203, in response to the trial operation, presenting a virtual image after a user using the target item, and performing S206.

S204, receiving a view operation for the target item recommended by the live streamer.

S205, in response to the view operation, presenting the three-dimensional effect diagram of the target item.

In embodiments of the present disclosure, when a user watches the live stream, the three-dimensional effect diagram of the target item may be presented to the user based on the user's view operation, so that the user can view the details of the target item in all directions, thereby reducing the need for returns and exchanges due to dissatisfaction after purchase. In this way, the time and money costs incurred by merchants and users due to returns and exchanges is reduced, and the user's experience of viewing the live stream and purchasing experience is improved.

The view operation may be an operation of viewing the three-dimensional effect diagram of the item, such as triggering a presenting control (such as a view control) in the live stream interface or the presenting interface.

When a user wants to view the three-dimensional effect diagram of the target item, the user can perform a view operation for the target item. Correspondingly, when the electronic device receives the user's view operation, it can obtain the three-dimensional effect diagram of the target item in response to the view operation, and present the three-dimensional effect diagram in the live stream interface or presenting interface. In this way, the user can control the rotation of the three-dimensional effect diagram by performing the corresponding operation to view the details of the target item at different angles.

In one embodiment, the electronic device can present the three-dimensional effect diagram of the target item in the live stream interface. For example, the electronic device can present the view control for the target item in the live stream interface, and switch, when the user triggering the view control of the target item is detected, the live stream image presented in the live stream interface to the three-dimensional effect diagram of the target item. Alternatively, an effect diagram presenting region in the live stream interface is created to present the three-dimensional effect diagram of the target item in the effect diagram presenting region, and the present size of the live stream image may be adjusted according to the size of the effect diagram presenting region.

Figure 12:
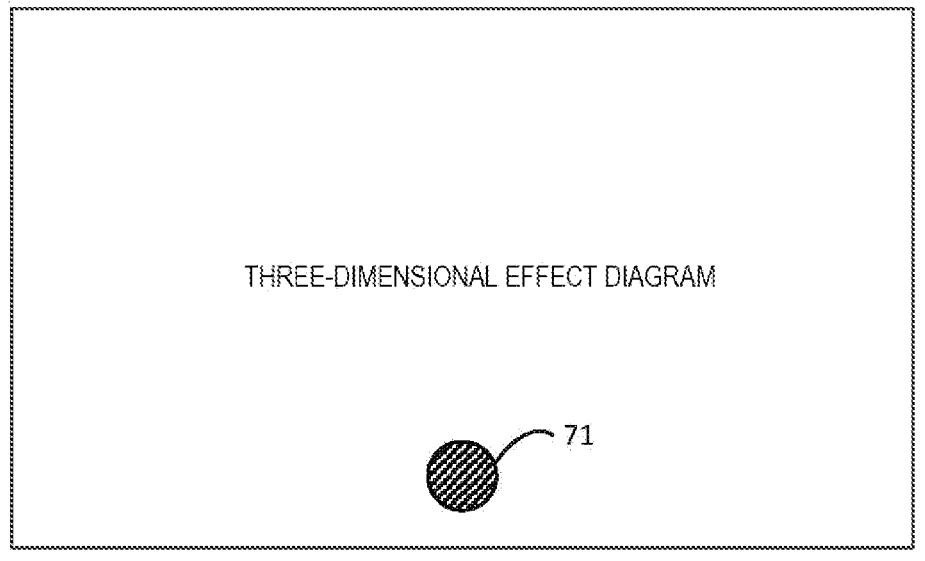
FIG. 12 shows a schematic diagram of a method of presenting a three-dimensional effect diagram according to embodiments of the present disclosure.

In another embodiment, the electronic device may also present the three-dimensional effect diagram of the target item in the presenting interface. For example, the electronic device may present the view control for the target item in the live stream interface, and switch, when it is detected that the user triggers the view control of the target item, the current display interface from the live stream interface to the presenting interface and present the three-dimensional effect diagram of the target item in the presenting interface, as shown in FIG. 12.

In addition, the presenting interface may also display view controls with the target item and/or other items, so that users can switch the target items presented in the presenting interface by triggering the view controls of the corresponding items.

In embodiments of the present disclosure, when the view control of the target item is presented in the live stream interface/presenting interface, the view control can be directly presented in the live stream interface/presenting interface, or it can also be presented in the recommended item list of the live stream interface/presenting interface, this embodiment does not limit this. Considering the convenience for a user to view the corresponding item and the simplicity of the interface, the view control of the item being recommended by the live streamer in the live stream image can be presented in the live stream interface/presenting interface, and the view control of multiple recommended items recommended by the live streamer in this live stream can be presented in a recommended item list of the live stream interface/presenting interface. Therefore, a user can view the three-dimensional effect diagram of the item currently being recommended by the live streamer by triggering the view control presented in the live stream interface/presenting interface; the user may instruct the electronic device to display the recommended item list in the live stream interface/presenting interface through the corresponding triggering operation, and view the three-dimensional effect diagram of the item by triggering the view control of an item presented in the recommended item list.

S206, receiving a specification change operation for the target item.

S207, changing the specification of the presented target item in response to the specification change operation.

The specification change operation may be an operation of changing the specification of the presented target item, such as changing the color of the presented target item by triggering the corresponding specification label of the target item.

In embodiments of the present disclosure, a user can change the specification of the target item in the virtual image or three-dimensional effect diagram to view the trial effect or details of the target item of different specifications.

When presenting a virtual image after a user using the target item and/or the three-dimensional effect diagram of the target item, the electronic device may also present the specification label of the target item. Therefore, when the user wants to change the specification of the presented target item, the corresponding specification label can be triggered. Correspondingly, when the electronic device detects that the user triggers a specification label of the target item, it can determine receiving a specification change operation for the target item, and in response to the specification change operation, determine the specification of the target item corresponding to the target label, and change the specification of the presented target item to this specification. That is, the virtual image after the user using the target item with the specification and/or the three-dimensional effect diagram of the target item with the specification is presented.

Taking changing the color of the target item as an example, the electronic device presents the color labels of the target item. Therefore, when users want to change the color of the presented target item, they can trigger the color label of the color they want to change to. Correspondingly, when the electronic device detects that the user triggers a certain color label of the target item, it can update the color of the target item in the virtual image or the color of the presented three-dimensional effect diagram to that color. That is, the virtual image after the user using the target item in the color and/or the three-dimensional effect diagram of the target item in the color is presented.

In one embodiment, the target item is the current recommended item in the live stream image, the method further comprises: displaying a first presenting control of the target item in the live stream interface for a user to perform the trial operation and the view operation; and/or displaying a second presenting control of the target item in the presenting interface for the user to perform the trial operation and the view operation.

The current recommended item may be an item being recommended in the live stream image at the current time. The first presenting control may be a control displayed in the live stream interface for instructing the electronic device to present the target item (such as presenting the virtual image after a user using the target item and/or three-dimensional effect diagram of the target item), which may comprise a trial control and/or a view control set in the live stream interface. The second presenting control may be a control displayed in the presenting interface for instructing the electronic device to present the target item, which may comprise a trial control and/or a view control set in the presenting interface.

In the above embodiment, the electronic device may directly present the trial control and the view control of the current recommended item in the live stream interface/presenting interface (rather than the recommended item list). The trial control and view control of the current recommended item may be different controls or the same control. That is, the electronic device may display the presenting control such as the trial control and view control of the current recommended item in the live stream interface/presenting interface, respectively. Alternatively, only one presenting control of the current recommended item may be displayed in the live stream interface/presenting interface. For example, only one first presenting control 21 of the current recommended item is presented in the live stream interface (as shown in FIG. 2-6), and only one second presenting control 71 of the current recommended item is presented in the presenting interface (as shown in FIG. 7-10 and FIG. 12), so that the trial and viewing of the current recommended item can be realized through the presenting control (comprising the first presenting control 21 and/or the second presenting control 71). For example, when it is detected that a user triggers the presenting control using a first triggering mode (such as clicking), it is determined that the trial operation for the current recommended item is received. When it is detected that a user triggers the presenting control using the second triggering mode (such as long press or drag), it is determined that the view operation for the current recommended item is received, in order to improve the simplicity of the live stream interface/presenting interface.

In the above embodiment, when the trial control and the view control are the same presenting control, triggering modes for the trial operation and the view operation can also be set to the same triggering mode, such as an operation of clicking the presenting control. At this time, the electronic device can determine whether the triggering operation is a trial operation/present operation according to an item type of the current presented item and respond accordingly. The trial operation and the view operation are the same triggering operation. Before the virtual image after the present user uses the target item, the method further comprises: determining that the target item is a trial item, and the trial item comprising a wearable item. Before presenting the three-dimensional effect diagram of the target item, the method further comprises: determining that the target item is a un-trial item other than the trial item.

The types of trial items may be set according to needs, such as wearable items and items that can be viewed for their trial effects, such as cosmetics. Correspondingly, un-trial items may be other types of items other than trial items.

The electronic device displays the presenting control of the current recommended item in the live stream interface/presenting interface as currently displayed. Therefore, when a user wants to view the current recommended item, the presenting control can be triggered. Correspondingly, when the electronic device detects the user's operation of triggering the presenting control, it can determine whether the current recommended item is a trial item. If the current recommended item is a trial item, the user's operation of triggering the presenting control can be determined as a trial operation, and in response to the trial operation, the virtual image after the user using the current recommended item can be presented. If the current recommended item is not a trial item, the user's operation of triggering the presenting control may be determined as a view operation, and in response to the view operation, the three-dimensional effect diagram of the current recommended item can be presented.

If the live streamer recommends a new item during the process of a user viewing the virtual image/three-dimensional effect diagram, i.e., if the current recommended item is changed, the electronic device may automatically update the presented virtual image/three-dimensional effect diagram to the virtual image/three-dimensional effect diagram of the current recommended item after being changed. The displayed presenting control may also be automatically updated to the presenting control of the current recommended item after being changed, so that the user can cause, by triggering the updated presented control, the electronic device to updated the presented virtual image/three-dimensional effect diagram to the virtual image/three-dimensional effect diagram of the current recommended item after being changed, embodiments of the present disclosure are not limited thereto.

The method of item presenting provided in embodiments of the present disclosure presents to a user the virtual image and/or three-dimensional effect diagram of the target item after the user using the target item, and changes the specification of the target item as presented based on the user's specification change operation, so that the user can intuitively and comprehensively view the details of the target item and improve the user's viewing experience.

Figure 13:
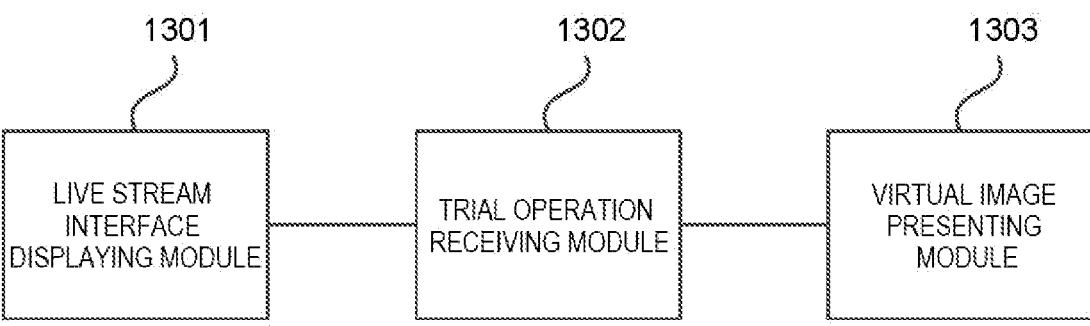
FIG. 13 shows a structural block diagram of an apparatus of item presenting according to embodiments of the present disclosure.

FIG. 13 is a structural block diagram of an apparatus of item presenting provided in embodiments of the present disclosure. The apparatus may be implemented by software and/or hardware, and may be configured in an electronic device. For example, the apparatus may be configured in a mobile phone, tablet computer, or computer, and may present items recommended by a live streamer by performing the method of item presenting. As shown in FIG. 13, the apparatus of item presenting provided in embodiments of the present disclosure may comprise: a live stream interface displaying module 1301, a trial operation receiving module 1302, and a virtual image presenting module 1303, wherein the live stream interface displaying module 1301 is configured to display a live stream interface, and the live stream interface is for presenting a live stream image of the live streamer; the trial operation receiving module 1302 is configured to receive a trial operation for the target item recommended by the live streamer; the virtual image presenting module 1303 is configured to present the virtual image after the user using the target item in response to the trial operation.

The apparatus of item presenting provided in embodiments of the present disclosure presents the live stream interface for displaying the live stream image of the live streamer through the live stream interface displaying module 1301; receives the trial operation for the target item recommended by the live streamer through the trial operation receiving module 1302; and presents the virtual image after the user using the target item through the virtual image presenting module 1303. By adopting the above technical solution, the virtual image after the user using the item recommended in the live stream are presented to the user when the user watches the live stream, so that the user can intuitively view the usage effect of the item recommended in the live stream and improve the user's viewing experience.

In the above embodiment, the virtual image presenting module 1303 may be configured to: present the virtual image after the user using the target item in the first presenting region, and presents the three-dimensional effect diagram of the target item in the second presenting region.

The apparatus of item presenting provided in embodiments of the present disclosure may further comprise: a view operation receiving module configured to receive a view operation for the target item recommended by the live streamer; a effect diagram presenting module configured to present a three-dimensional effect diagram of the target item in the presenting interface in response to the view operation.

In the above embodiment, the target item may be an item currently recommended in the live stream image, the apparatus of item presenting provided in embodiments of the present disclosure may further comprise: a control presenting module configured to present a first presenting control for the target item in the live stream interface for a user to perform the trial operation and the view operation; and/or present a second presenting control for the target item in the presenting interface for the user to perform the trial operation and the view operation.

In the above embodiment, the trial operation and the view operation may be the same triggering operation, the apparatus of item presenting provided in embodiments of the present disclosure may further comprise: a first determining module, configured to determine that the target item is a trial item before presenting the virtual image after a user using the target item, the trial item comprising a wearable item; a second determining module, configured to determine the target item is a un-trial items other than the trial item present before presenting the three-dimensional effect diagram of the target item.

The apparatus of item presenting provided in embodiments of the present disclosure may further comprise: a change operation receiving module configured to receive a specification change operation for the target item; a specification change operation module, configured to change the specification of the presented target item in response to the specification change operation.

The apparatus of item presenting provided in embodiments of the present disclosure may further comprise: an obtaining module configured to obtain item information of the target item present before presenting the virtual image after the user using the target item, and turn on the camera to capture a user's video image through the camera; a generating module configured to generate virtual image after the user using the target item according to the item information and the video image.

In the above scheme, the item information may be a three-dimensional effect diagram, and the generating module may comprise: an angle determining unit configured to determine a shooting angle of a user in the video image; an image determining unit configured to determine an item image of the target item when the presenting angle is the shooting angle according to the three-dimensional effect diagram; and an image generating unit configured to compose the item image with the video image to obtain virtual image after the user using the target item.

The apparatus of item presenting provided in the present disclosure can perform the method of item presenting provided in any embodiment of the present disclosure, and has functional modules and effects corresponding to the method of item presenting. Technical details that are not described in detail in this embodiment can be found in the method of item presenting provided in any embodiment of the present disclosure.

Figure 14:
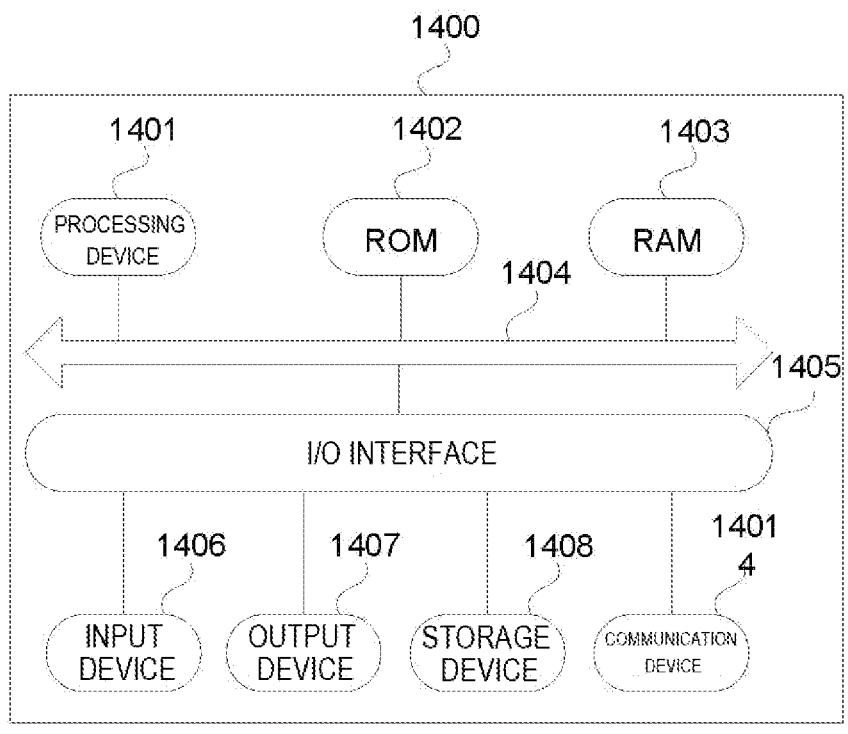
FIG. 14 shows a structural schematic diagram of an electronic device according to embodiments of the present disclosure.

Referring now to FIG. 14, which shows a schematic structural diagram of an electronic device (e.g., a terminal device) 1400 adapted for implementing embodiments of the present disclosure. The terminal device 1400 in embodiments of the present disclosure may comprise, but is not limited to, a mobile terminal such as a mobile phone, a laptop, a digital broadcast receiver, a personal digital assistant (PDA), a tablet computer (PAD), a portable media player (PMP), a car-mounted terminal (e.g., car-mounted navigation terminals), etc., and a fixed terminal such as a digital television (TVs), a desktop computer, etc. The electronic device 1400 shown in FIG. 14 is merely an example and should not impose any limitation on the functionality and usage scope of embodiments of the present disclosure.

As shown in FIG. 14, the electronic device 1400 may comprise a processing device (such as a Central Processor, graphics processing unit, etc.) 1401, which can perform various appropriate actions and processes based on programs stored in Read-Only Memory (ROM) 1402 or programs loaded from storage device 1408 into Random Access Memory (RAM) 1403. In RAM 1403, various programs and data required for the operation of the electronic device 1400 are also stored. The processing device 1401, ROM 1402, and RAM 1403 are connected to each other through a bus 1404. The input/output (I/O) interface 1405 is also connected to the bus 1404.

Typically, the following apparatus can be connected to the I/O interface 1405: an input device 1406 comprising a touch screen, a touchpad, a keyboards, a mouse, a camera, a microphone, an accelerometer, a gyroscope, etc.; an output device 1407 comprising a liquid crystal display (LCD), a speaker, a vibrator, etc.; a storage device 1408 comprising a magnetic tape, a hard disk, etc.; and a communication device 1409. The communication device 1409 can allow the electronic device 1400 to communicate wirelessly or wirelessly with other devices to exchange data. Although FIG. 14 shows an electronic device 1400 with multiple apparatuses, it is not required to implement or have all of the apparatuses as shown. More or fewer apparatuses can be implemented or provided instead.

According to embodiments of the present disclosure, the process described above with reference to the flowchart can be implemented as a computer software program. For example, embodiments of the present disclosure comprise a computer program product that comprises a computer program carried on a non-transitory computer-readable medium, the computer program containing program code for performing the method shown in the flowchart. In such embodiments, the computer program can be downloaded and installed from the network through the communication device 1409, or installed from the storage device 1408, or installed from the ROM 1402. When the computer program is executed by the processing device 1401, the above-described functions defined in embodiments of the present disclosure are performed.

The computer-readable storage medium described above may be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Examples of computer-readable storage media may comprise but are not limited to: an electrical connection with one or more wires, a portable computer disk, a hard disk, RAM, ROM, an erasable programmable read-only memory (EPROM or flash memory), an optical fiber, a compact disk read-only memory (CD-ROM), an optical storage device, a magnetic storage device, or any suitable combination thereof. In the disclosure, a computer-readable storage medium may be any tangible medium containing or storing a program that can be used by an instruction execution system, apparatus, or device, or in combination therewith. In the disclosure, a computer-readable signal medium may comprise a data signal propagated in baseband or as part of a carrier wave, which carries computer-readable program code. Such propagated data signals may take many forms, comprising but not limited to electromagnetic signals, optical signals, or any suitable combination thereof. Computer-readable signal media may also be any computer-readable medium other than computer-readable storage media, which can send, propagate, or transmit programs for use by or in conjunction with an instruction execution system, apparatus, or device. The program code contained on the computer-readable medium can be transmitted using any suitable medium, comprising but not limited to: wires, optical cables, radio frequency (RF), etc., or any suitable combination thereof.

In some implementations, clients and servers can communicate using any currently known or future developed network protocol such as HTTP (HyperText Transfer Protocol) and can interconnect with any form or medium of digital data communication (such as communication networks). Examples of communication networks include local region networks ("LANs"), wide region networks ("WANs"), internets (such as the Internet), and end-to-end networks (such as ad hoc end-to-end networks), as well as any currently known or future developed networks.

The computer readable medium mentioned above can be included in the electronic device mentioned above; it can also exist separately without being assembled into the electronic device.

The computer readable medium carries one or more programs. When one or more programs are executed by the electronic device, cause the electronic device to display a live stream interface, the live stream interface being for presenting a live stream image of a live streamer; receive a trial operation for a target item recommended by a live streamer; and in response to the trial operation, present a virtual image after a user using the target item.

Computer program code for executing the operations disclosed herein may be written in one or more programming languages or combinations thereof, including but not limited to object-oriented programming languages such as Java, Smalltalk, C++, as well as conventional procedural programming languages such as "C" or similar programming languages. Program code can be completely executed on the user's computer, partially executed on the user's computer, executed as a standalone software package, partially executed on the user's computer, partially executed on a remote computer, or completely executed on a remote computer or server. In cases involving remote computers, the remote computer can be connected to the user's computer through any type of network, including LAN or WAN, or can be connected to an external computer (such as using an Internet service provider to connect through the Internet).

The flowchart and block diagram in the attached figure illustrate the possible architecture, functions, and operations of systems, methods, and computer program products according to various embodiments of the present disclosure. At this point, each box in a flowchart or block diagram can represent a module, program segment, or part of code that contains one or more executable instructions for implementing specified logical functions. It should also be noted that in some alternative implementations, the functions indicated in the boxes can also occur in a different order than those indicated in the accompanying drawings. For example, two consecutive boxes can actually be executed in parallel, and sometimes they can also be executed in the opposite order, depending on the function involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions.

The units described in the present disclosed embodiment can be implemented through software or hardware. Among them, the name of the unit does not constitute a qualification for the unit itself in a certain situation.

The functions described above in this article can be at least partially executed by one or more hardware logic components. For example, non-limiting examples of hardware logic components that can be used include: Field Programmable Gate Arrays (FPGAs), Application Specific Integrated Circuits (ASICs), Application Specific Standard Products (ASSPs), On Chip Systems (SOC), Complex Programmable Logic Devices (CPLDs), and so on.

In the context of this disclosure, machine readable media can be tangible media that can contain or store programs for use by or in combination with instruction execution systems, devices, or devices. A machine readable media can be machine readable signal media or machine readable storage media. A machine readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, RAM, ROM, EPROM or Flash memory), an optical fiber, CD-ROM, an optical storage device, a magnetic storage device, or any suitable combination of the foregoing.

According to one or more embodiments of the present disclosure, Example 1 provides a method of item presenting, comprises:

displaying a live stream interface, wherein the live stream interface is for presenting a live stream image of a live streamer;

receiving a trial operation for a target item recommended by the live streamer; and in response to the trial operation, presenting a virtual image after a user using the target item.

According to one or more embodiments of the present disclosure, Example 2, the method according to Example 1, the presenting virtual image after a user using the target item comprises:

presenting the virtual image after the user using the target item in a first presenting region, and presenting a three-dimensional effect diagram of the target item in a second presenting region.

According to one or more embodiments of the present disclosure, Example 3, the method according to Example 1, further comprises:

receiving a view operation for the target item recommended by the live streamer;

in response to the view operation, presenting the three-dimensional effect diagram of the target item in a presenting interface.

According to one or more embodiments of the present disclosure, Example 4, the method according to Example 3, the target item is a current recommendation item in the live stream image, the method further comprises:

displaying a first presenting control of the target item in the live stream interface for the user to perform the trial operation and the view operation; and/or displaying a second presenting control of the target item in the presenting interface for the user to perform the trial operation and the view operation.

According to one of more embodiments of the present disclosure, Example 5, the method according to Example 4, the trial operation and the view operation are a same triggering operation, and before the presenting virtual image after a user using the target item, the method further comprises:

determining that the target item is a trial item, wherein the trial item comprises a wearable item;

wherein before the presenting the three-dimensional effect diagram of the target item, the method further comprises:

determining the target item is an un-trial items other than the trial items.

According to one or more embodiments of the present disclosure, Example 6, the method according to any of Examples 1-5, further comprises:

receiving a specification change operation for the target item; and in response to the specification change operation, changing a specification of the presented target item.

According to one or more embodiments of the present disclosure, Example 7, the method according to any of Examples 1-5, further comprises, before the presenting virtual image after a user using the target item:

obtaining item information of the target item, and turning on a camera to capture video image of the user through the camera; and generating the virtual image after the user using the target item according to the item information and the video image.

According to one or more embodiments of the present disclosure, Example 8, the method according to Example 7, the item information is a three-dimensional effect diagram, and the generating the virtual image after the user using the target item based on the item information and the video image comprises:

determining a shooting angle for the user in the video image;

determining, based on the three-dimensional effect diagram, an item image of the target item in a case where a presenting angle is the shooting angle; and composing the item image and the video image to obtain the virtual image after the user using the target item.

According to one or more embodiments of the present disclosure, Example 9 provides an apparatus of item presenting comprising:

a live stream interface displaying module configured to display a live stream interface, wherein the live stream interface is for presenting live stream image of a live streamer;

a trial operation receiving module configured to receive a trial operation for a target item recommended by the live streamer; and a virtual image presenting module configured to present a virtual image after a user using the target item in response to the trial operation.

According to one or more embodiments of the present disclosure, Example 10 provides an electronic device comprising:

at least one processor; and a memory configured to store at least one program;

the at least one program, when executed by the at least one processor, causing the at least one processor implement a method of item presenting according to any of examples 1-8.

According to one or more embodiments of the present disclosure, Example 11 provides a computer-readable storage medium storing a computer program, wherein the program, when executed by a processor, implements the method of item presenting of any one of examples 1-8.

In addition, although multiple operations are depicted in a specific order, this should not be understood as requiring these operations to be performed in the specific order shown or in sequential order. Under certain circumstances, multi-tasking and parallel processing may be advantageous. Similarly, although multiple implementation details are comprised in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable subcombination.

What is claimed is:

1. A method of item presenting, comprising:

displaying a live stream interface, wherein the live stream interface is for presenting a live stream image of a live streamer;

receiving a trial operation for a target item recommended by the live streamer;

in response to the trial operation, capturing an image of a user and obtaining information of the target item;

generating a virtual image based on the image of the user and the information of the target item; and presenting the virtual image that displays an effect of the target item being tried on the user;

wherein the method further comprises:

receiving a view operation for the target item recommended by the live streamer;

in response to the view operation, presenting a three-dimensional effect diagram of the target item in a presenting interface;

wherein the target item is a current recommended item in the live stream image, and the method further comprises at least one of:

displaying a first presenting control of the target item in the live stream interface for the user to perform the trial operation and the view operation;

displaying a second presenting control of the target item in the presenting interface for the user to perform the trial operation and the view operation.

2. The method of claim 1, wherein the presenting the virtual image comprises:

presenting the virtual image in a first presenting region, and presenting the three-dimensional effect diagram of the target item in a second presenting region.

3. The method of claim 1, wherein the trial operation and the view operation are a same triggering operation, and before the presenting the virtual image, the method further comprises:

determining that the target item is a trial item, wherein the trial item comprises a wearable item; and before the presenting the three-dimensional effect diagram of the target item, the method further comprises:

determining that the target item is an un-trial item other than the trial item.

4. The method of claim 1, further comprising:

receiving a specification change operation for the target item; and in response to the specification change operation, changing a specification of the presented target item.

5. The method of claim 1, before the presenting the virtual image, the method further comprising:

turning on a camera to capture the image of the user through the camera.

6. The method of claim 1, wherein the information of the target item comprises a three-dimensional effect diagram of the target item, and wherein the generating the virtual image based on the image of the user and the information of the target item comprises:

determining a shooting angle for the user in the image;

determining, based on the three-dimensional effect diagram, an item image of the target item in response to determining that a presenting angle is the shooting angle; and generating the virtual image based on composing the item image and the image of the user.

7. An electronic device of item presenting, comprising:

one or more processors, a memory configured to store one or more programs, wherein the one or more programs, when executed by the one or more processors, cause the one or more processors to implement operations comprising:

displaying a live stream interface, wherein the live stream interface is for presenting a live stream image of a live streamer;

receiving a trial operation for a target item recommended by the live streamer;

in response to the trial operation, capturing an image of a user and obtaining information of the target item;

generating a virtual image based on the image of the user and the information of the target item; and presenting the virtual image that displays an effect of the target item being tried on the user;

wherein the operations further comprise:

receiving a view operation for the target item recommended by the live streamer;

in response to the view operation, presenting a three-dimensional effect diagram of the target item in a presenting interface;

wherein the target item is a current recommended item in the live stream image, and the operations further comprise at least one of:

displaying a first presenting control of the target item in the live stream interface for the user to perform the trial operation and the view operation;

displaying a second presenting control of the target item in the presenting interface for the user to perform the trial operation and the view operation.

8. A non-transitory computer readable storage medium storing a computer program, wherein the program, when executed by a processor, causes the processor to implement operations comprising:

displaying a live stream interface, wherein the live stream interface is for presenting a live stream image of a live streamer;

receiving a trial operation for a target item recommended by the live streamer; and in response to the trial operation, capturing an image of a user and obtaining information of the target item;

generating a virtual image based on the image of the user and the information of the target item; and presenting the virtual image that displays an effect of the target item being tried on the user;

wherein the operations further comprise:

receiving a view operation for the target item recommended by the live streamer;

in response to the view operation, presenting a three-dimensional effect diagram of the target item in a presenting interface;

wherein the target item is a current recommended item in the live stream image, and the operations further comprise at least one of:

displaying a first presenting control of the target item in the live stream interface for the user to perform the trial operation and the view operation;

displaying a second presenting control of the target item in the presenting interface for the user to perform the trial operation and the view operation.

9. The electronic device of claim 7, wherein the presenting the virtual image comprises:

presenting the virtual image in a first presenting region, and presenting the three-dimensional effect diagram of the target item in a second presenting region.

10. The electronic device of claim 7, wherein the trial operation and the view operation are a same triggering operation, and before presenting the virtual image, the operations further comprise:

determining that the target item is a trial item, wherein the trial item comprises a wearable item; and before presenting the three-dimensional effect diagram of the target item, the operations further comprise:

determining that the target item is an un-trial item other than the trial item.

11. The electronic device of claim 7, the operations further comprising:

receiving a specification change operation for the target item; and in response to the specification change operation, changing a specification of the presented target item.

12. The electronic device of claim 7, before presenting the virtual image, the operations further comprise:

turning on a camera to capture the image of the user through the camera.

13. The electronic device of claim 7, wherein the information of the target item comprises the three-dimensional effect diagram of the target item, and wherein the generating the virtual image based on the image of the user and the information of the target item comprises:

determining a shooting angle for the user in the image;

determining, based on the three-dimensional effect diagram, an item image of the target item in response to determining that a presenting angle is the shooting angle; and generating the virtual image based on composing the item image and the image of the user.

14. The non-transitory computer readable storage medium of claim 8, wherein the presenting the virtual image comprises:

presenting the virtual image in a first presenting region, and presenting the three-dimensional effect diagram of the target item in a second presenting region.

15. The non-transitory computer readable storage medium of claim 8, wherein the trial operation and the view operation are a same triggering operation, and before presenting the virtual image, the operations further comprise:

determining that the target item is a trial item, wherein the trial item comprises a wearable item; and before presenting the three-dimensional effect diagram of the target item, the operations further comprise:

determining that the target item is an un-trial item other than the trial item.

16. The non-transitory computer readable storage medium of claim 8, the operations further comprising:

receiving a specification change operation for the target item; and in response to the specification change operation, changing a specification of the presented target item.

17. The non-transitory computer readable storage medium of claim 8, before presenting the virtual image, the operations further comprise:

turning on a camera to capture the image of the user through the camera.

18. The non-transitory computer readable storage medium of claim 8, wherein the information of the target item comprises the three-dimensional effect diagram of the target item, and wherein the generating the virtual image based on the image of the user and the information of the target item comprises:

determining a shooting angle for the user in the image;

determining, based on the three-dimensional effect diagram, an item image of the target item in response to determining that a presenting angle is the shooting angle; and generating the virtual image based on composing the item image and the image of the user.

* * * * *